united States Patent [19]
Gillery

[11] Patent Number: 4,990,408
[45] Date of Patent: Feb. 5, 1991

[54] LOW REFLECTANCE, HIGHLY SATURATED COLORED COATING FOR MONOLITHIC GLAZING

[75] Inventor: Frank H. Gillery, Allison Park, Pa.

[73] Assignee: PPG Industries, Inc., Pittsburgh, Pa.

[21] Appl. No.: 125,437

[22] Filed: Nov. 25, 1987

[51] Int. Cl.$^5$ .............................................. B32B 15/04
[52] U.S. Cl. .................................... 428/469; 428/698; 428/701
[58] Field of Search ................ 428/469, 701, 432, 698

[56] References Cited

U.S. PATENT DOCUMENTS

| 3,990,784 | 11/1976 | Gelber | 350/166 |
| 4,022,947 | 5/1977 | Grubb et al. | 428/432 |
| 4,534,841 | 8/1985 | Hartig et al. | 204/192 P |
| 4,610,771 | 9/1986 | Gillery | 204/192.1 |

Primary Examiner—Thomas J. Herbert
Attorney, Agent, or Firm—Donna L. Seidel

[57] ABSTRACT

A transparent article for reflecting solar energy comprising a tin/antimony oxide film which exhibits color by interference effects and a reflective metal film preferably comprising chromium is disclosed along with a sputtering method for its production.

5 Claims, No Drawings

LOW REFLECTANCE, HIGHLY SATURATED COLORED COATING FOR MONOLITHIC GLAZING

BACKGROUND OF THE INVENTION

The present invention relates generally to the art of sputtering metal-containing films on non-metallic substrates, and more particularly to the art of magnetic sputtering of multiple-layer metal/dielectric transparent films on glass.

U.S. Pat. No. 3,990,784 to Gelber discloses a coated architectural glass system comprising a transparent substrate and a multi-layer coating comprising first and second metal layers with a dielectric layer between them, wherein the first and second metal layers have a thickness ratio so that the transmission of the coating can be changed independent of its reflection properties by varying the thickness of the metal layers while maintaining the ratio constant. The dielectric has a thickness such that the reflection from the coating is not strongly colored.

U.S. Pat. No. 4,022,947 to Grubb et al discloses a transparent panel capable of transmitting a desired portion of visible radiation while reflecting a large portion of incident solar radiation and a method of preparing same, by sputtering an iron, nickel and chromium alloy to obtain a transparent metal film, and reactively sputtering the same or a similar alloy in the presence of oxygen to form an oxide film. In one preferred embodiment, the metal film lies between the substrate and the metal oxide film. In another preferred embodiment, the metal oxide film lies between the substrate and the metal film.

U.S. Pat. No. 4,534,841 to Hartig et al discloses solar-control glazing produced by applying first an oxide layer having an optical thickness of 20 to 280 nanometers to a transparent substrate by cathodic evaporation in an oxygen-containing atmosphere, and second a chromium nitride layer having a geometric thickness of 10 to 40 nanometers applied in an atmosphere consisting of an inert gas, such as argon, and nitrogen. An optical third dielectric layer may be applied to the second layer. The oxide layer is selected from oxides of tin, titanium and aluminum.

Architectural glass products with metallic and/or metal oxide films are growing in importance as energy demands for heating and cooling become increasingly expensive. Coated glass architectural products generally fall into two categories, solar energy control and high transmittance, low emissivity coated products.

Solar energy control glass products are generally glass substrates, often tinted, coated with a low visible transmittance colored film which reduces solar energy transmittance through the windows into the building interior, thereby reducing air conditioning costs. These products are most effective in warm climates and are most often seen in commercial construction. In areas where heating costs are of greater concern, and particularly in residential construction, high transmittance, low emissivity coatings are desirable in order to allow high transmittance of visible light into the interior while reflecting infrared radiation to retain heat inside the building. High transmittance, low emissivity coatings are typically multiple layer films wherein an infrared reflecting metal such as silver, gold or copper is sandwiched between anti-reflective metal oxide layers such as bismuth, indium and/or tin oxides. Solar energy control films, on the other hand, are typically single layer films of one or more metals or oxides of metals such as cobalt, iron, chromium, nickel, copper, etc.

The simplest method of producing a colored reflective coating is to use the body color of the metal. Thus, depositing copper produces a copper colored coating, gold produces a gold color, nickel a gray color, and so on. A more sophisticated coating technique is to modify the metal color or create a new color by introducing an absorption-colored coating in front of the metal. The interference effect is usually weak, but if reasonably large and equal reflections are made to interfere, the effect can be quite strong. This can be done by using dielectrics of high refractive index, or by enhancing the reflectance of the dielectric layer with metal layers. This involves using the two-layer sequence of metal oxide dielectric/metal or the three layer sequence of metal/metal oxide dielectric/metal.

Early well known films were of the body color variety. Wet chemical methods for producing such films for solar energy control are well known from U.S. Pat. Nos. 3,846,152; 4,091,172; 3,723,158; and 3,457,138. When vacuum coating technologies became commercially available, those existing colored coatings could be duplicated using essentially the same metals as the originals. Sputtering technologies for producing metallic solar energy control films are disclosed in U.S. Pat. Nos. 4,512,863 and 4,594,137. Disadvantages of metallic coatings are their lack of color variety and intensity, and the large number of materials and target sequences needed to make them. A desirable new series of coatings should provide a maximum number of colors from a minimum number of materials. For this to be accomplished, the interference color type of coating is ideal since its color can be changed by changing the thickness of the dielectric layer, and its transmittance and reflectance by changing the thickness of the metal layer or layers. The other desirable properties of a new series of coatings are intense saturated color, low reflectance, and second surface monolithic durability; i.e., the coating should be hard and chemically durable. In addition, the materials used should be inexpensive, non-toxic, and fast-sputtering. The reflectance color of a material is described by its luminous reflectance spectrophotometric curve. The intense colors are produced by large amplitudes of the curve, and low reflectance requires the curve minimum to approach zero. Second order interference colors are more intense than first order, but third order interference colors become less intense. In general, high refractive index materials produce high reflectances or large curve amplitudes. High refractive index dielectric materials also give a more intense color for double layer coating. For a metal/dielectric/metal sequence of layers, it appears that a lower refractive index dielectric material may give acceptable results.

SUMMARY OF THE INVENTION

The present invention provides a novel and superior dielectric film for use in a wide variety of multiple-layer architectural coatings on glass. The present invention involves sputtering tin and antimony simultaneously in an atmosphere comprising oxygen in order to deposit a coating comprising tin/antimony oxide. The tin/antimony oxide film of the present invention is deposited in combination with a metal-containing film such as chromium nitride to form a variety of colored multi-layer coatings with relatively saturated colors.

DESCRIPTION OF THE PREFERRED EMBODIMENTS

The present invention provides the capability of making a series of colored coatings with a minimum of layers and materials. The coating system of the present invention has relatively low reflection, high color saturation and monolithic durability.

It is known that a color series can be made with first and second metal layers surrounding a layer of a transparent dielectric material; the color being varied by changing the thickness of the dielectric layer. However, previously known dielectric materials are deficient in one or more of the requisite properties of high index of refraction, fast sputtering and monolithic durability. The tin/antimony oxide of the present invention has the above properties, as well as the ability, in combination with a suitable metal film, to produce intensely colored architectural coatings. For example, tin/antimony oxide in combination with a chromium-based film can be used to make a range of attractive colors with excellent durability.

Using reflectance circle diagrams and computer calculations, it is determined that a two layer combination of metal and dielectric has an optimum thickness for both layers which gives the minimum reflectance and highest color saturation combination. The higher the refractive index of the dielectric, the lower the transmission of the coating at the optimum, and the higher the color saturation. Metals with low n and high k, where n and k are the real and complex parts of the complex refractive index, defining the propagation of electromagnetic radiation in the medium, tend to give the lowest transmission and highest saturation.

If the thickness of the metal is increased in an attempt to lower the transmission, the reflectance increases and the color intensity is diminished. Depositing a very thin metal layer prior to the deposition of the dielectric layer can decrease the reflectance and give a more intense saturated color. If the thickness of the primary metal layer is increased in combination with the deposition of a very thin metal layer, a low transmittance, low reflectance, highly colored coating can be produced. It two primary metal layers are used, a low refractive index dielectric in combination with a low n, high k metal gives the most attractive appearance. The calculations show that at 20 percent light transmittance, adequate saturation can be obtained using a metal in combination with a dielectric with a refractive index of 2.3. For a lower refractive index dielectric, a metal-dielectric-metal system is preferred.

With the tin/antimony oxide of the present invention, many metal or metal alloy films can be used to provide a multiple-layer coating with good properties. Preferred films include metals such as chromium, metal-based coatings such as slightly oxidized chromium and, most preferably, chromium nitride.

In a conventional magnetron sputtering process, a substrate is placed within a coating chamber in facing relation with a cathode having a target surface of the material to be sputtered. Preferred substrates in accordance with the present invention include glass, ceramics and plastics which are not detrimentally affected by the operating conditions of the coating process.

The cathode may be of any conventional design, preferably an elongated rectangular design, connected with a source of electrical potential, and preferably employed in combination with a magnetic field to enhance the sputtering process. The anode is preferably a symmetrically designed and positioned assembly as taught in U.S. Pat. No. 4,478,702 by Gillery et al, the disclosure of which is incorporated herein by reference.

A clean glass substrate is placed in a coating chamber which is evacuated, preferably to less than $10^{-4}$ torr, more preferably less than $2 \times 10^{-5}$ torr. A selected atmosphere of reactive gases, preferably argon and oxygen, is established in the chamber to a pressure between about $5 \times 10^{-4}$ and $10^{-2}$ torr. A cathode having a target surface of tin and antimony is operated over the surface of the substrate to be coated. The target metals are sputtered, reacting with the atmosphere in the chamber to deposit a tin/antimony oxide coating layer on the glass surface.

After the initial layer of tin/antimony oxide is deposited, the coating chamber is evacuated, and an inert atmosphere such as pure nitrogen is established at a pressure between about $5 \times 10^{-4}$ and $10^{-2}$ torr. A cathode having a target surface of metal or metal alloy, preferably chromium, is operated over the tin/antimony oxide coated surface. The target is sputtered to deposit a metallic layer on the tin/antimony oxide coated glass surface. While chromium metal, and chromium in a slightly oxidized state, are useful in accordance with the present invention, chromium nitride is preferred.

In most preferred embodiments of the present invention, a metal film is deposited under, as well as over, the tin/antimony oxide film. As in the case of a two layer film, the dominant wavelength of the reflected color from the uncoated surface depends almost totally on the thickness of the tin/antimony oxide layer. The thickness of the top metal layer is varied until the transmission has approximately the required value, then the thickness of the underlying metal layer is varied until the desired reflection from the uncoated side of the article is attained. Final modification of the top metal film thickness may be required to obtain the optimum final transmittance. Within the thickness range of interest, increasing the thickness of the top metal film decreases the transmittance and increases the reflectance from the uncoated side of the coated article. Increasing the thickness of the bottom metal film within the thickness range of interest decreases the transmittance and decreases the reflectance from the uncoated side.

The coating derives its color from the interference effect of the dielectric layer, depending on its thickness. A chromium nitride-tin/antimony oxide-chromium nitride film in accordance with the present invention is especially attractive in a deep blue form. The tin/antimony oxide layer is preferably deposited by sputtering a tin/antimony alloy cathode. The proportions of tin and antimony are preferably between 10 and 90 percent of each, more preferably 20 to 50 percent antimony and the balance tin, and most preferably 25 percent antimony and 75 percent tin.

EXAMPLE I

A tin/antimony oxide dielectric film is deposited as follows. An alloy of tin and antimony, comprising 50 percent of each, is sputtered in an atmosphere comprising 50 percent each of argon and oxygen at a pressure of 4 millitorr. A cathode measuring 5 by 17 inches (about 12.7 by 43.2 centimeters) is sputtered at a power of 1.5 kilowatts, and the voltage is 380 volts. A glass substrate passes under the cathode at a speed of 100 inches (2.54 meters) per minute, and a coating is deposited at a rate of 135 Angstroms per pass. The refractive index of the coating is about 2.03 at 550 nanometers. The coating is not attacked by 2.5 percent salt solution in 17 hours. When overcoated with a nickel alloy, the tin/antimony oxide coating survives 38 days in the Cleveland (condensing humidity) Test, 65 hours in 2.5 percent salt solution, and 8 hours in either 6 Normal hydrochloric acid or 12 Normal nitric acid, showing only slight attack after 24 hours in these acids.

the relative film thicknesses in terms of cathode power in kilowatts, the transmittances after deposition of each layer, and the reflected color in terms of color coordinates and visual observation from the uncoated glass surface of the coated article.

| EXAMPLE | First CrN Power | % T | SnSb$_x$ Power | % T | Second CrN Power | % T | R$_2$ (Second Surface Reflectance) Y | x | y | Color |
|---|---|---|---|---|---|---|---|---|---|---|
| III | 0.6 | 78 | 1.9 | 71 | 6.8 | 17 | 13.7 | .2437 | .2633 | pale blue |
| IV | 1.1 | 64 | 1.9 | 64 | 5.9 | 16 | 10.7 | .2246 | .2397 | blue |
| V | 1.4 | 58 | 1.9 | 62 | 5.8 | 17 | 9.2 | .2236 | .2342 | deep blue |
| VI | 2.0 | 46 | 1.9 | 54 | 4.0 | 18 | 10.5 | .2356 | .2464 | blue |
| VII | 2.6 | 38 | 1.9 | 47 | 4.0 | 16 | 13.6 | .2592 | .2745 | pale blue |
| VIII | 1.4 | 58 | 2.1 | .62 | 5.1 | 17 | 11.2 | .2261 | .2459 | green-blue |
| IX | 1.4 | 58 | 1.8 | 61 | 5.5 | 17 | 7.5 | .2259 | .2260 | red-blue |
| X | 1.4 | 59 | 1.6 | 61 | 5.2 | 17 | 6.5 | .2325 | .2249 | red-blue |
| XI | 1.3 | 63 | 1.3 | 63 | 5.5 | 18 | 5.9 | .3339 | .3065 | purple-pink |
| XII | 0.6 | 77 | 1.0 | 70 | 6.4 | 18 | 11.7 | .3714 | .3766 | orange-yellow |
| XIII | 1.1 | 63 | 1.0 | 62 | 6.1 | 18 | 9.2 | .3802 | .3788 | dark orange-yellow |

EXAMPLE II

A multiple layer coating of tin/antimony oxide and chromium nitride is deposited on a glass substrate under the following conditions. A clean glass substrate is maintained in a vacuum chamber in an atmosphere of pure nitrogen at a pressure of 2.2 millitorr. With a cathode powered at 6 kilowatts at 377 volts, a chromium target size of 15 by 106 inches (about 0.4 by 2.7 meters) and a line speed of 82 inches (about 2.1 meters) per minute, a chromium nitride layer 35 Angstroms thick is deposited, reducing the transmittance of the glass to 70 percent. The oxide layer is applied from three targets of 50/50 tin/antimony running at voltages between 320 and 340 volts at a total in an atmosphere of 50/50 argon/oxygen at a pressure of 3 millitorr and the same glass speed. The transmission is reduced to 58 percent by the tin/antimony oxide layer. A final layer of chromium nitride is deposited from a single chromium cathode energized at 472 volts and 54 kilowatts in an atmosphere of pure nitrogen at 3 millitorr. At the same glass speed, a single pass reduces the transmittance to 18 percent. The coating has a deep blue color with chromaticity coordinates of Y=9.28, x=0.2325 and y=0.2460 in reflectance from the uncoated glass surface. The coating is extremely hard, increasing in transmittance by only 1 to 6 percent when subjected to 80 cycles of a CS10F wheel on a Taber Abrasor. The coating also survives immersion in 30 percent nitric acid or 20 percent hydrochloric acid for 24 hours, three months in the Cleveland (condensing humidity) Test at 150° F. (about 66° C.), and one month in a 5 percent salt spray.

EXAMPLES III to XIII

For these examples, the chromium nitride films are deposited in pure nitrogen at 3 millitorr, the tin/antimony oxide films are deposited in 50/50 argon/oxygen at 4 millitorr, the targets are all 5 by 17 inches (12.7 by 43.2 centimeters) and the line speed is 80 inches (about 2 meters) per minute. The following table shows The above examples are offered to illustrate the present invention. Various metal-containing layers may be used on one or both sides of the tin/antimony oxide dielectric layer of the present invention in a wide range of thicknesses depending on the desired transmittance and reflectance properties. The thickness of the tin/antimony oxide dielectric film itself is varied to produce the desired color. The ranges of sputtering parameters such as pressure, atmosphere, power, voltage, line speed and so on are dependent on the sputtering apparatus employed and the desired throughput. The scope of the present invention is defined by the following claims.

I claim:

1. An article of manufacture for the reflectance of solar energy comprising:
   a. a transparent substrate;
   b. a transparent reflective metallic film deposited on a surface of the substrate;
   c. a transparent tin/antimony oxide film of a thickness which exhibits color by interference effects deposited on said metallic film; and
   d. a second reflective transparent metallic film deposited on said tin/antimony oxide film.

2. An article according to claim 1, wherein the second transparent reflective metallic film comprises chromium.

3. An article according to claim 2, wherein said second metallic film is selected from the group consisting of chromium metal, chromium oxide and chromium nitride.

4. An article according to claim 3, wherein said second metallic film is chromium nitride.

5. An article of manufacture for the reflectance of solar energy comprising:
   a. a transparent substrate;
   b. a transparent metal-containing film deposited on a surface of said substrate;
   c. a transparent tin/antimony oxide film deposited on said transparent metal-containing film, wherein the thickness of said transparent tin/antimony oxide film is predetermined for the coated article to exhibit a predetermined interference color; and
   d. a second metal-containing film deposited on said transparent tin/antimony oxide film.

* * * * *